United States Patent [19]

Inoue et al.

[11] Patent Number: 4,845,190

[45] Date of Patent: Jul. 4, 1989

[54] PROCESS FOR PREPARING POLYARYLENE SULFIDES WITH RECOVERY OF CARBOXYLIC ACID

[75] Inventors: Hiroshi Inoue; Toshikazu Kato; Noriaki Emura, all of Yokkaichi, Japan

[73] Assignees: Tosoh Corporation; Toso Susteel Co., Ltd., both of Japan

[21] Appl. No.: 137,693

[22] Filed: Dec. 24, 1987

[30] Foreign Application Priority Data

Dec. 24, 1986 [JP] Japan .................. 61-306577

[51] Int. Cl.$^4$ ............................. C08G 75/16
[52] U.S. Cl. ...................... 528/388; 528/86; 528/222; 528/226; 528/487; 528/493; 528/494; 528/496; 528/497
[58] Field of Search ................. 528/388, 86, 226, 222, 528/493, 494, 496, 497, 487

[56] References Cited

U.S. PATENT DOCUMENTS

| | | | |
|---|---|---|---|
| 3,354,129 | 11/1967 | Edmonds et al. | 260/79 |
| 3,919,177 | 11/1975 | Campbell | 260/79.1 |
| 3,948,865 | 4/1976 | Brady et al. | 528/388 |
| 4,038,261 | 7/1977 | Crouch et al. | 260/79.1 |
| 4,038,262 | 7/1977 | Edmonds | 260/79.1 |
| 4,064,114 | 12/1977 | Edmonds | 260/79.1 |
| 4,116,947 | 9/1978 | Edmonds et al. | 528/388 |
| 4,350,810 | 9/1982 | Tieszen et al. | 528/388 |
| 4,663,431 | 5/1987 | Fujii et al. | 528/388 |
| 4,699,975 | 10/1987 | Katto et al. | 528/388 |
| 4,728,723 | 3/1988 | Nakamura et al. | 528/388 |

*Primary Examiner*—Harold D. Anderson
*Attorney, Agent, or Firm*—Sughrue, Mion, Zinn, Macpeak and Seas

[57] ABSTRACT

In a process for preparing polyarylene sulfides by reacting a dihalo-aromatic compound with a sulfur source in an organic amide solvent in the presence of an alkali metal salt of carboxylic acid as a polymerization aid or assistant, a specific class of carboxylic acids are employed for preparing the alkali metal salt polymerization aid. The specific carboxylic acids are of the general formula: $R(COOH)_n$ (wherein R is a $C_1$–$C_{20}$ organic radical and n is an integer not less than 1) and have a solubility of not less than 3 g/100 ml in ethanol at 20° C. Use of such a carboxylic acid in the process permits the recovery thereof from the polymerization mixture to be effected with significantly improved efficiency.

26 Claims, No Drawings

PROCESS FOR PREPARING POLYARYLENE SULFIDES WITH RECOVERY OF CARBOXYLIC ACID

FIELD OF THE INVENTION

This invention relates to a process for preparing polyarylene sulfides and, in particular, to such a process in which an alkali metal salt of carboxylic acid employed as a polymerization aid is effectively recovered as a corresponding carboxylic acid.

PRIOR ART

Polyarylene sulfides, a typical example of which is polyphenylene sulfide, have attracted a great deal of attention as materials for forming, for example, electronic instrument members and automobile instrument members because of their excellent thermal and chemical resistance properties. They may be molded or shaped into various articles such as molded parts, films, sheets and fibers by known molding techniques, for example injection molding and extrusion molding. These products have been widely used in a variety of applications where high thermal resistance properties are required.

An example of these processes for producing polyarylene sulfides is disclosed in Japanese Patent Publication (KOKOKU) No. 45-3368, where a dihalo-aromatic compound is reacted with a sulfur source such as sodium sulfide in an organic amino solvent such as N-methyl pyrrolidone.

However, the polymers produced by the above process have such a low molecular weight that they cannot be successfully employed in, for example, injection molding. It has therefore been the practice for these low molecular weight polymers to be oxidatively cross-linked by heating them in air prior to their use in molding processes. The thus further "polymerized" polymers show poor extrusion processability, possibly due to the considerable extent of cross-linking and branching caused by the heating, and thus can be formed into, for example, films and fibers only with difficulty.

Therefore, it has been proposed to prepare polyaryleneich sulfides of a higher molecular weight by certain polymerization techniques. A typical example of such techniques is disclosed in, for example, Japanese Patent Publication (KOKOKU) No. 52-12240, where a polymerization aid of the formula R-COOM (wherein R is a hydrocarbyl group and M is an alkali metal) is employed and the polymerization is effected in the presence of the polymerization aid. The thus prepared polymers of increased molecular weight show improved extrusion procesability properties and are suitable as materials for forming thin articles such as films and fibers. Where a polyarylene sulfide of an increased molecular weight is prepared by this process, however, a correspondingly increased quantity of the expensive polymerization aid employed, such as lithium acetate, is required. Further, since the polymerization stage discharges an aqueous waste contaminated with the used polymerization aid, the contaminated effluent gives rise to othe problems. For example, an expensive system for treating the contaminated effluent needs to be provided and operated with commensurate high running costs in order to prevent environmental pollution.

SUMMARY OF THE INVENTION

The present invention provides an improved process for preparing polyarylene sulfides of increased molecular weight in which the difficulties and problems experienced in the conventional processes have been eliminated or substantially reduced. According to the present process, the increased molecular weight polyarylene sulfides may be produced at a low cost without being accompanied by environmental pollution problems.

Accordingly, the present invention relates to a process for preparing polyarylene sulfides which comprises reacting a dihalo-aromatic compound with a sulfur source in an organic amide solvent in the presence of an alkali metal salt derived from an carboxylic acid having the general formula $R(COOH)_n$ (wherein R is an organic radical containing from 1 to 20 carbon atoms and n is an integer of unity or greater) and having a solubility of not less than 3 g/100 ml in ethanol at 20° C., said process being further characterized in that the solvent, the polyarylene sulfide product and the carboxylic acid are recovered from the polymerization reaction mixture through at least the following three steps:

(a) recovering the solvent from the polymerization reaction mixture to leave a residual mixture comprising the product polymer, the alkali metal salt of carboxylic acid and any by-product salt;

(b) acidifying the residual mixture from step (a) and washing the residual mixture with ethanol; and (c) distilling off the ethanol from the ethanol washings obtained in step (b) so as to recover the carboxylic acid from the washings.

PREFERRED EMBODIMENTS OF THE INVENTION

The carboxylic acids which may be used in the present invention are represented by the general formula:

$$R(COOH)_n$$

wherein R is an organic radical containing from 1 to 20 carbon atoms and n is an integer of unity (1) or greater. Although the R radical is defined to be a $C_1$–$C_{20}$ organic radical, it may carry one or more substituents which are inert during the polymerization; for example ketone, amide and sulfone groups. Further, R may be a residue of a heterocyclic compound, for example, a pyridine or imidazol compound. The above-defined carboxylic acid is converted to the form of an alkali metal salt which is used as a polymerization aid and, after the polymerization, recovered in the form of free acid. The alkali metal salts which may be used in the present invention are preferably lithium, sodium and potassium salts and especially sodium salts. The carboxylic acids used in the present invention should have a solubility of greater than 3 g/100 ml in ethanol at 20° C. in order to permit the recovery of carboxylic acid to be effected with an acceptably high efficiency. The higher the solubility, the easier the extraction of carboxylic acid with ethanol. Specific examples of the carboxylic acids which may be used in the present invention include acetic, propionic, oxalic, adipic, sebacic, benzoic, o-toluic, m-toluic, p-toluic, phenyl acetic, phenoxy acetic, malonic, phthalic, terephthalic, 1,2,4-trimellitic, pyromellitic, p-methoxy benzoic, 3,4-dimethoxy benzoic, nicotinic and picolinic acids. Two or more of these acids may be used as a mixture.

The alkali metal salt of carboxylic acid is suitably employed in a quantity of 0.05 to 3 moles, preferably 0.1 to 2 moles, per mole of the dihalo-aromatic compound. If the salt is employed in too small a quantity, the molecular weight-increasing effect will not be attained to a significant extent. On the other hand, if an excessive amount of the salt is employed, then some difficulties will be experienced during the operation: for example, the reaction mixture will become too viscous to be efficiently stirred. The salt of carboxylic acid may be added at any time before the dihalo-aromatic compound is introduced and the polymerization is initiated.

Preferably, the solvent used in the present process is a polar solvent, in particular an aprotic solvent which is stable in the presence of alkalis at elevated temperatures. Examples of solvents which may be used include N,N-dimethylacetamide, N,N-dimethylformamide, dimethyl sulfoxide, hexamethyl phosphoramide, N-methyl-ε-caprolactam, N-ethyl-2-pyrrolidone, N-methyl-2-pyrrolidone, and 1,3-dimethyl imidazoline. The most preferred is N-methyl-2-pyrrolidone.

Examples of sulfur sources which may be used in the present invention include alkali metal sulfides, combinations of alkali metal hydrosulfides with alkali metal bases, and combinations of hydrogen sulfide with alkali metal bases. Such an alkali metal sulfide or hydrosulfide may be employed in hydrated form. The sulfur source may be formed in situ in the polymerization system prior to introduction of the dihalo-aromatic compound. Alternatively, the sulfur source may be prepared before it is added to the polymerization system. Before the dihalo-aromatic compound is introduced into and polymerized in the polymerization system, the water content in the polymerization system is preferably reduced, for example by distillation, to a level less than 1.5 moles per mole of the sulfur source. Preferred specific examples of sulfur sources which may be mentioned are sodium sulfide, combination of sodium hydrosulfide with sodium hydroxide, and combination of hydrogen sulfide with sodium hydroxide.

Examples of the dihalo-aromatic compounds which may be used in the present invention include p-dichlorobenzene, m-dichlorobenzene, o-dichlorobenzene, p-dibromobenzene, dichloronaphthalenes, dibromonaphthalenes, dichlorodiphenyl sulfones, dichlorobenzophenones, dichlorodiphenyl ethers, dichlorodiphenyl sulfides, dichlorodiphenyls, dibromodiphenyls and dichlorodiphenyl sulfoxides, and mixtures thereof. Preferred ar p-dihalobenzenes, in particular p-dichlorobenzene. If desired, a small proportion of a polyhalo-aromatic compound may be used in place of part of the dihalo-aromatic compound, provided that the linearity of the product polymer is not undesirably affected thereby. Examples of the polyhalo-aromatic compounds are trichlorobenzenes, tetrachlorobenzenes, trichloroanphthalenes and mixtures thereof.

The polymerization may be effected at 200° C. to 300° C., preferably 220° C. to 280° C., for 0.5 to 10 hours, preferably 1 to 5 hours with stirring.

In the present process, the dihalo-aromatic compound is preferably employed in such an amount that the molar ratio of the sulfur source to the dihalo-aromatic compound falls within the range of from 1.00:0.95 to 1.00:1.10. The solvent may be used in such an amount that the polymer produced during polymerization is from 5 to 60%, preferably from 10 to 50%, by weight on the basis of the solvent.

As mentioned above, in order to obtain polyarylene sulfides of increased molecular weight by polymerization techniques, an alkali metal salt of carboxylic acid may be used as a polymerization aid. However, such polymerization processes have been accompanied by serious problems, for example, the fact that the polymerization aid is expensive and must be used in a large quantity and that the apparatus for treating the waste effluent from the process requires a good deal of capital and the operation is expensive.

Thus, according to the present invention, the above problems have been substantially solved by converting the alkali metal salt of carboxylic acid once it has been used as a polymerization aid in the process into the form of free carboxylic acid and then recovering the latter. Consequently, the present invention permits polyarylene sulfides of increased molecular weight to be produced at a reduced cost.

The recovery of carboxylic acid according to the present invention will be described in more detail. The recovery procedure comprises at least the following three steps (a), (b) and (c):

(a) A step of recovering the solvent from the reaction mixture after polymerization. In this step, the solvent used in the polymerization is separated and recovered from the produced polymer, the used carboxylate salt and any by-product salts. The recovery may be effected, for example, by heating the reaction mixture under a reduced pressure so as to distil out and recover the solvent; or by adding to the reaction mixture another solvent in which the polymerization solvent is soluble but the carboxylate salt and any by-product salts are insoluble, filtering the mixture and recovering the polymerization solvent from the filtrate; or by a method comprising an appropriate combination of the above two methods. Examples of solvents which may be used in the above-mentioned second filtration method include benzene, toluene, xylenes, chloroform, diphenyl ether, methyl isobutyl ketone and monochlorobenzene.

(b) A step in which the mixture comprising the polymer, carboxylate salt and by-product salts from the above step (a) are acidified and the acidified mixture is washed or extracted with ethanol. In this step, the alkali metal salt of carboxylic acid which has been used as a polymerization aid is converted, by acidification, into the form of free carboxylic acid which has been used as a polymerization aid is converted, by acidification, into the form of free carboxylic acid and the thus formed free carboxylic acid is dissolved in ethanol and then separated from the polymer and by-product salts such as NaCl. In other words, in the instant step, the mixture comprising the polymer, the carboxylate salt and the by-product salts is extracted with ethanol under an acidified condition so as to allow the carboxylic acid to be recovered in the form of free acid.

(c) A step of distilling the ethanol from the ethanol washings obtained in the above step (b) so as to leave the carboxylic acid which is then recovered. In this step, the solution having the carboxylic acid dissolved in the ethanol is separated into the carboxylic acid and the ethanol. The isolated carboxylic acid may be converted into an alkali metal salt, for example, by reaction with an alkali metal hydroxide and then may be reused as a polymerization aid in the present process. The separated ethanol may be returned to and reused in the above step (b).

On the other hand, the mixture comprising the product polymer and the by-product salts which is separated from the carboxylic acid in the above step (b) is subjected to polymer recovery comprising repeatedly washing the mixture with water or hot water to remove any by-product salts therefrom.

A typical example of the polyarylene sulfides which may be produced in accordance with the present invention is poly(p-phenylene sulfide)

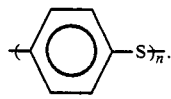

Other examples of the polyarylene sulfides which may be produced include:

polyphenylene sulfide sulfone polyphenylene sulfide ketone polyphenylene sulfide ether polydiphenylene sulfide

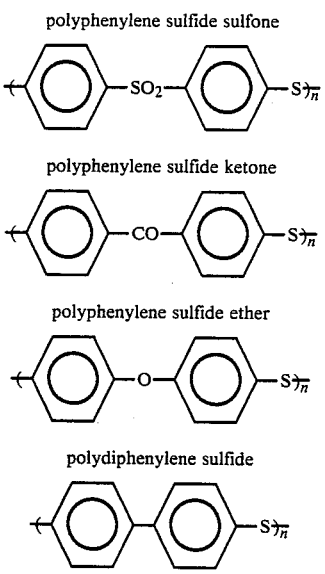

and copolymers containing two or more of the above-listed repeating units.

Since the polyphenylene sulfides (PPSs) produced in accordance with the present invention are in a highly polymerized state and have an increased molecular weight, they are suitable for use not only in injection molding but in extrusion molding of various articles, such as fibers, films and pipes. If desired, additives, for example a reinforcement such as glass fiber; an inorganic filler such as calcium carbonate, talc or mica; and a pigment; may be incorporated into the polyarylene sulfide polymers.

EXAMPLE

The present invention will be illustrated in more detail with reference to the follwoing Examples to which, however, the present invention is not restricted.

In the following Examples, the melt viscosities of the polyarylene sulfide products were determined in a KOHKA type flow tester provided with a die orifice 0.5 mm in diameter and 2 mm in length using a temperature of 300° C. and a weight of 10 kg.

EXAMPLE 1

A stainless steel (SUS 316) autoclave 500 ml in capacity was charged with sodium sulfide $Na_2S \cdot 2.7H_2O$ (0.61 moles), sodium nicotinate (0.184 moles) and NMP (150 ml). The contents were stirred and heated to 220° C. under a stream of nitrogen, while a distillate mainly comprising water (22.7 g) was distilled off. After cooling the system to 170° C., p-dichlorobenzene (0.6 moles) was added together with an additional amount of NMP (50 ml) to the system. Thereafter, the system was sealed under a stream of nitrogen and heated to 230° C. for 2 hours and then to 265° C. for a further 2 hours to allow the polymerization to proceed. On completion of the polymerization, the reaction mixture was passed into an evaporator where it was heated under a reduced pressure to distil off the NMP. To the residue, ethanol (500 ml) was added. The mixture was adjusted to a pH of 3 with sulfuric acid and stirred at 80° C. for 30 minutes, and then filtered.

The filter cake of solids was again treated with ethanol, washed under a similar acidic condition for 1 hour at 140° C. and filtered. Any residual ethanol was evaporated from the thus washed filter cake of solids which was then repeatedly washed with warm water and dried to give the product polymer at a yield of 94%. The polymer had a melt viscosity of 118 Pa·s.

The first ethanolic filtrate was combined with the second ethanolic filtrate obtained from washing of the solids residue. Then the mixture was passed into an evaporator and heated under a reduced pressure to distil off the ethanol. The residue was further heated to dryness to completely remove any residual ethanol. The thus obtained solid was found to consist essentially of nicontinic acid. The yield was 25.9 g with a purity of 85% and the recovery rate was 97%.

EXAMPLE 2

The recovered nicotinic acid (25.9 g) from Example 1 (purity 85%; equivalent to 0.179 moles) was dissolved in 70 ml of water together with sodium hydroxide (0.179 moles). The mixture was allowed to react for 30 minutes under reflux conditions. Thereafter, the water was distilled off to leave a solid residue consisting mainly of sodium nicotinate.

The procedure described in Example 1 was repeated except that the above obtained solid residue was employed in place of the 0.184 moles of sodium nicotinate. The yield of the product polymer was 95%. The melt viscosity was 114 Pa·s.

EXAMPLE 3

The procedure described in Example 1 was conducted using 0.184 moles of sodium phthalate in place of the 0.184 moles of sodium nicotinate.

The product polymer was obtained at a yield of 94%. The melt viscosity was 82 Pa·s.

On the other hand, the yield of the recovered phthalic acid was 33.0 g. The purity was found to be 88%. The recovery rate was 95%.

COMPARATIVE EXAMPLE 1

This comparative example illustrates use of isophthalic acid having a low solubility (1.5 g/100 ml, at 20° C.) in ethanol.

The procedure described in Example 1 was repeated except that 0.184 moles of sodium isophthalate was employed in place of the sodium nicotinate (0.184 moles).

The polymer was obtained at a yield of 94%. The polymer had a melt viscosity of 70 Pa·s.

On the other hand, the yield of the recovered isophthalic acid was 18.0 g. The purity was found to be 83%. The recovery rate was at a level as low as 49%.

This is indicative of the fact that use of a carboxylic acid having a low solubility in ethanol may result in an unacceptably inefficient ability to recover the acid.

COMPARATIVE EXAMPLE 2

The procedure as described in Example 1 was repeated except that the extraction and washing of the solids residue with ethanol was effected without acidifying the residue/ethanol mixture.

The yield of the recovered sodium nicotinate was 12.1 g. The purity of the recovered salt was found to be 84%. The recover rate was at a level as low as 38%. This indicates that the acidification of the alkali metal salt of carboxylic acid for converting it to the form of free acid so as to increase the solubility in ethanol is essential for the present invention.

As illustrated above, according to the present invention, the polymerization aid can be efficiently recovered from and reused in the polyarylene sulfide production.

What is claimed is:

1. A process for preparing polyarylene sulfides which comprises reacting a dihalo-aromatic compound with a sulfur source in an organic amide solvent in the presence of an alkali metal salt derived from an carboxylic acid having the general formula $R(COOH)_n$; (wherein R is an organic radical containing from 1 to 20 carbon atoms and n is an integer of unity or greater) and having a solubility of not less than 3 g/100 ml in ethanol at 20° C., said process being further characterized in that the solvent, the polyarylene sulfide product and the carboxylic acid are recovered from the polymerization reaction mixture through at least the following three steps:
   (a) recovering the solvent from the polymerization reaction mixture to leave a residual mixture comprising the product polymer, the alkali metal salt of carboxylic acid and any by-product salt;
   (b) acidifying the residual mixture from step (a) and washing the residual mixture with ethanol; and
   (c) distilling off the ethanol from the ethanol washings obtained in step (b) so as to recover the carboxylic acid from the washings.

2. A process according to claim 1 wherein the carboxylic acid is selected from the group consisting of acetic, propionic, oxalic, adipic, sebacic, benzoic, o-, m-and p-toluic, phenyl acetic, phenoxy acetic, malonic, phthalic, terephthalic, 1,2,4,-trimellitic, pyromellitic, p-methoxy benzoic, 3,4-dimethoxybenzoic, nicotinic and picolinic acids and mixtures thereof.

3. A process according to claim 1 or claim 2 wherein the alkali metal salt is a lithium, sodium, or potassium salt.

4. A process according to claim 3 wherein the alkali metal salt is a sodium salt.

5. A process according to claim 1 wherein the alkali metal salt is employed in a proportion of from 0.05 to 3 moles per mole of the dihaloaromatic compound.

6. A process according to claim 5 wherein the alkali metal salt is employed in a proportion of from 0.1 to 2 moles per mole of the dihalo-aromatic compound.

7. A process according to claim 1 wherein the amide solvent is a polar solvent.

8. A process according to claim 7 wherein the solvent is an aprotic solvent stable against alkali at elevated temperatures.

9. A process according to claim 7 or claim 8 wherein the solvent is selected from the group consisting of N,N-dimethylacetamide, N,N-dimethylformamide, dimethyl sulfoxide, hexamethyl phosphoramide, N-methyl-ϵ-caprolactam, N-ethyl-2-pyrrolidone and 1,3-dimethyl imidazoline and mixtures thereof.

10. A process according to claim 8 wherein the solvent is N-methyl-2-pyrrolidone.

11. A process according to claim 1 wherein the sulfur source is selected from the group consisting of alkali metal sulfides, combinations of alkali metal hydrosulfides with alkali metal bases, and combinations of hydrogen sulfide with alkali metal bases.

12. A process according to claim 11 wherein the sulfur source is selected from the group consisting of sodium sulfide, a combination of sodium hydrosulfide with sodium hydroxide, and a combination of hydroxide with sodium hydroxide.

13. A process according to claim 11 or claim 12 wherein the alkali metal sulfide(s) or hydrosulfide(s) are in the hydrate form.

14. A process according to claim 1 wherein the water content in the polymerization system is at a level of not greater than 1.5 moles per mole of the sulfur source before the dihalo-aromatic compound is introduced into the system.

15. A process according to claim 1 wherein the dihalo-aromatic compound is selected from the group consisting of o, m-, and p dichlorobenzenes, p-dibromobenzene, dichloronaphthalenes, dibromonaphthalenes, dichlorodiphenyl sulfones, dichlorobenzophenones, dichlorodiphenyl ethers, dichlorodiphenyl sulfides, dichlorodiphenyls, dibromodiphenyls and dichlorodiphenyl sulfoxides and mixtures thereof.

16. A process according to claim 15 wherein the dihalo-aromatic compound is a p-dihalobenzene.

17. A process according to claim 16 wherein the dihalo-aromatic compound is a p-dichlorobenzene.

18. A process according to claim 15, claim 16 or claim 17 wherein the dihalo-aromatic compound is used in conjunction with a polyhalo-aromatic compound in a minor proportion which will give rise to substantially no undesirable effect on the linearity of the product polyarylene sulfide polymer.

19. A process according to claim 18 wherein the polyhalo-aromatic compound is selected from the group consisting of trichlorobenzenes, tetrachlorobenzenes and trichloronaphthalenes.

20. A process according to claim 1 wherein the molar ratio of the sulfur source to the dihalo-aromatic compound used ranges from 1.00:0.95 to 1.00:1.10.

21. A process according to claim 1 wherein the polymerization is effected at a temperature of 200° C. to 300° C. for a period of 0.5 to 10 hours with stirring.

22. A process according to claim 21 wherein the polymerization is effected at a temperature of 220° C. to 280° C. for a period of 1 to 5 hours with stirring.

23. A process according to claim 1 wherein the solvent is recovered from the polymerization reaction mixture by means of distillation in step (a).

24. A process according to claim 1 wherein the solvent is recovered from the polymerization reaction mixture in step (a) by treating the reaction mixture with another solvent in which the solvent to be recovered is soluble, but the carboxylate salt and by-product salts are insoluble, filtering the treated mixture and recovering the intended solvent from the resulting filtrate.

25. A process according to claim 24 wherein said another solvent is selected from the group consisting of benzene, toluene, xylenes, chloroform, diphenyl ether, methyl isobutyl ketone and monochlorobenzene and mixtures thereof.

26. A process according to claim 1 wherein the solids residue resulting from step (b) is washed with water or hot water to remove the byproduct salts and give the product polymer.

* * * * *